May 30, 1967          D. S. CARY          3,322,034
FROST COLOR DISPLAY
Filed Sept. 2, 1965
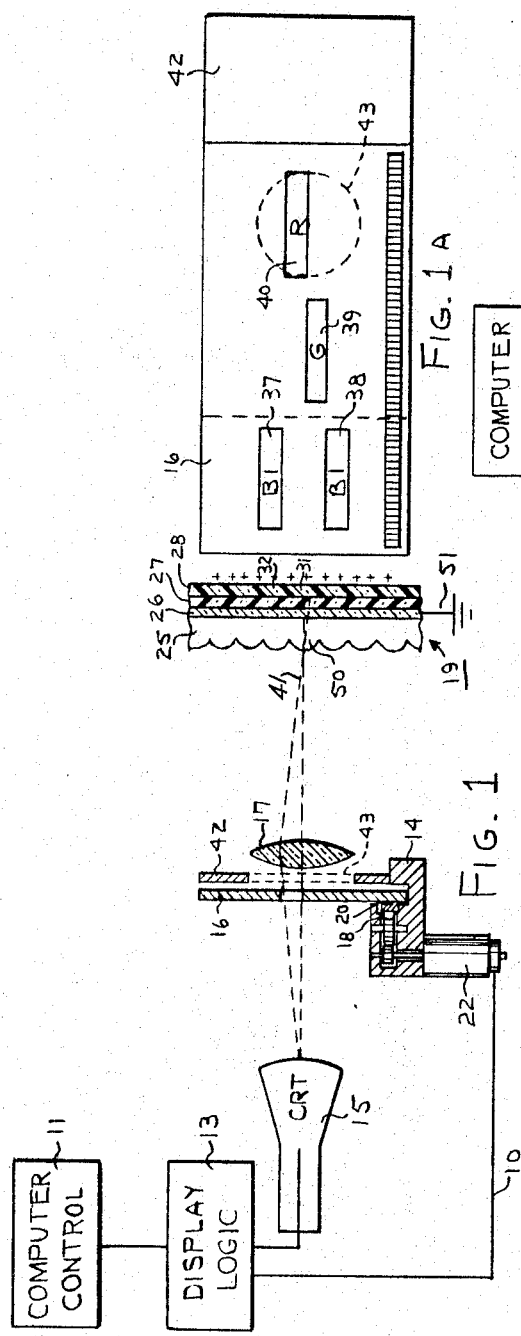
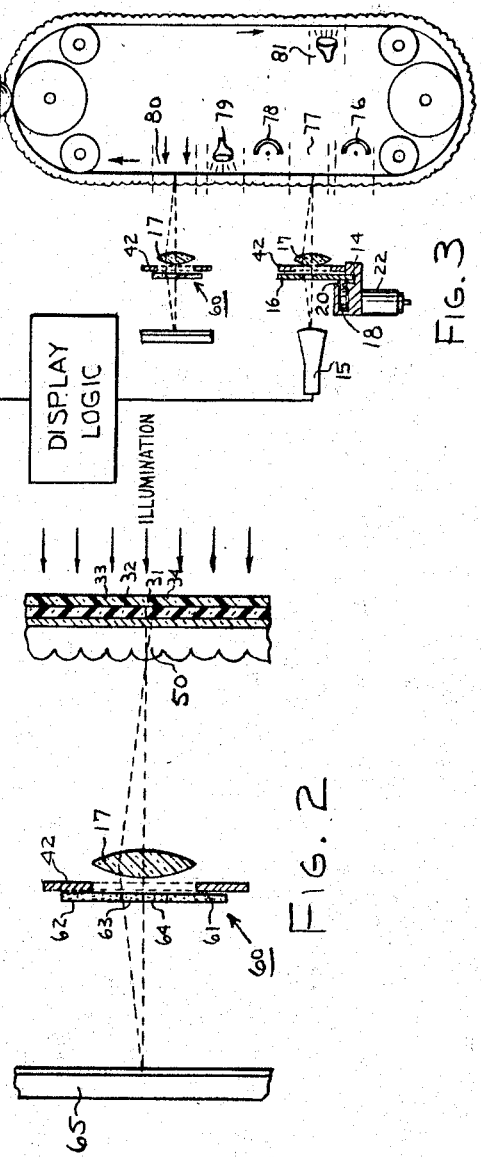
INVENTOR.
DONALD S. CARY
BY
ATTORNEYS

United States Patent Office 3,322,034
Patented May 30, 1967

3,322,034
FROST COLOR DISPLAY
Donald S. Cary, Pittsford, N.Y., assignor to Xerox Corporation, Rochester, N.Y., a corporation of New York
Filed Sept. 2, 1965, Ser. No. 484,600
1 Claim. (Cl. 88—24)

This invention relates to visual presentation of graphic information, and more particularly to presentation of such information by means of multi-colored displays in which given colors consistently represent particular classes of information.

The selective use of color in a visual presentation has long been recognized as an invaluable aid for increasing comprehension and speed of recognition of the material thereby presented. In the simplest hand-drawn charts, for example, a given color will often be chosen to represent a first parameter, a second and different color for another parameter and so forth. Where such simple schemes of data presentation are involved, colors may be thus introduced with relative simplicity. But where the data to be graphically presented is highly complex, and where the nature of such data requires constantly changing displays, the introduction of color coding is not so readily achieved.

One might, for example, consider the case of an optically projected display representative of positions and directions of movement of various aircraft within an airspace. While it is common to prepare a monochromatic display of such information, it would obviously be of enormous utility to introduce into such displays various color codings to represent different classes of aircraft and/or differing directions of movement. Since, however, the type of information being considered changes almost from moment to moment, any method utilized must be capable not only of rapidly introducing the desired colored effects to begin with, but must readily lend itself as well to almost continuous updating and modification of the displayed information.

It is accordingly an object of the present invention to provide a method for converting graphic information into a visual display having color characteristics in accordance with a preselected scheme for presentation of the information.

It is another object of the present invention to provide a method for readily converting a monochromatic display of graphic information into a display colored in accordance with the type of information of which particular portions of the monochromatic display are representative.

It is a further object of the present invention to provide a method for conversion of a monochromatic display to a color display that is rapid, reliable, and simple of application.

It is yet a further object of the present invention to provide a method for conversion of monochromatic displays to full color displays, pursuant to which modification of the resulting color display may be readily achieved.

In the present invention use is made of an imaging process disclosed in the copending application of Robert W. Gundlach and Kenneth Gunther, Ser. No. 192,377, now abandoned, entitled Electrostatic Frosting, filed on May 8, 1962, and assigned to the same assignee as the present application. The "Frost" process therein disclosed is capable of producing high resolution continuous tone images by deformation of thermoplastic materials in the presence of image configurated electric fields. The appellation applied to these images arises by virtue of their distinctive appearance, the latter being physically attributable to the high light scattering characteristics of the deformed image areas. Such high light scattering characteristics combines with the ease of formation and erasure of such images, to create the foundation for the present invention.

In accordance with the present invention, a sequential presentation of differing portions of a monochromatic display is projected upon a transparent erasable recording medium comprising generally a lenticular substrate laminated to a light sensitive, thermoplastic overcoated, photoconductive layer. The sequential display of monochromatic information is latently registered on interlaced portions of the light sensitive medium by means of a movable aperture plate positioned at the aperture of the recording lens, the movement of this aperture plate being coordinated with the display of successive portions of information. An interlaced Frost deformation image is subsequently heat developed on the recording medium. Projection of a light source through the imaged member and onto a screen thereafter provides the desired full color presentation. Upon completion of the viewing process the image is erased by the simple expedient of heating, and a new color display is prepared.

A fuller understanding of the present invention, of the manner in which the invention achieves the objects previously recited, and of the invention's multiple advantages as compared to the prior art, may now best be gained by a reading of the following detailed specification, and from a simultaneous examination of the drawings appended hereto in which:

FIGURE 1 diagrammatically illustrates a basic embodiment of the present invention;

FIGURE 1A is a planar view of aperture plate 16 of FIGURE 1.

FIGURE 2 diagrammatically illustrates the manner in which a projection member prepared pursuant to the present invention may be utilized for full color display;

FIGURE 3 diagrammatically illustrates the manner in which the present invention may be embodied into a complete continuous system.

In FIGURE 1 a monochromatic display source is illustrated as a cathode ray tube (CRT) 15. For purposes of concretely illustrating the manner in which the present invention operates, it may be assumed that the information displayed upon the face of this CRT comprises a pictorial representation of multiple aircraft operating within a geographically delimited airspace. For limited durations of time ranging in the order of seconds to minutes the visual representation will accordingly be fixed and may consist of symbolic representations for the various aircraft such as circles, crosses and the like, as well as illuminated background demarcations indicating geographical boundary lines or physical features of the terrain underlying the airspace. It may be assumed as well that differing classes of aircraft are under surveillance within the particular airspace and that it is accordingly of considerable interest to introduce into the visual display some means of differentiating between these classes. Thus, for example, a given aircraft might be considered an "enemy," a second aircraft a "friend," a third aircraft might be considered an "unknown" and so forth. Indicia may also be present in the monochromatic visual display indicating the direction of movement of the particular aircraft, such as arrows attached to the locus of the aircraft, etc.

Control of the display upon the cathode ray tube 15 initiates at the computer control 11. The latter integrates inputs from various radar tracking stations and, in turn, supplies inputs to the display logic 13 which directly controls the visual presentation. The CRT presentation is imaged by lens 17 on the light sensitive member indicated generally by the numeral 19. An aperture plate 16 is positioned in the limiting aperture of lens 17 and adjacent a fixed stop plate 42, for purposes to be explained shortly.

This plate 16 is slidably mounted in a base 14, which is provided with geared means 18. The latter are operated by electrical actuator 22, which is in turn responsive to signals fed from display logic at 13. As will be demonstrated shortly, the aperture plate 16 is positioned in synchronism with the successive display of varying portions of the CRT presentation, so that the various slots within the aperture plate will act to appropriately register the several parts of the CRT image on the light sensitive member 19.

The light sensitive member 19 appearing at the right of FIGURE 1 is shown greatly enlarged in order to illustrate its structure; thus, the transparent lenticulated substrate 25 actually will have a thickness of less than $\frac{1}{100}$ of an inch and the adjacent transparent layer 26—as well as the transparent photoconductive layer 27 and the thermoplastic layer 28—will each have a thickness substantially less than the lenticulated substrate 25.

The lenticulated substrate 25 comprising the surface of light sensitive member 19 closest to lens 17 is identical with the embossed surfaces that are conventionally joined to photographic emulsions to form the well-known embossed films utilized in additive color photography. Such films, in various widths, have been available for years from the Eastman Kodak Co., of Rochester, New York. The lenticulated substrate 25 may, in fact, be conveniently derived from such films by removal therefrom of the photographic emulsion. As is well known the so-called lenticules are actually small cylindrical lenses embossed in the transparent acetate base material comprising substrate 25. These lenticules, of which there are approximately 25 per millimeter length of film, extend completely across the width of the embossed material, the action of each lenticule being such as to image the lens aperture at approximately the exposed surface of the transparent thermoplastic layer 28.

Deposited upon the flat side of lenticulated substrate 25 are the successive thin layers 26, 27 and 28. In the present invention these several layers must be formed of essentially transparent materials. The conductive layer 26 may by way of illustration be conveniently formed from a 200 angstrom layer or aluminum. Although it is not completely evident from the drawing, this layer will—because of the nature of the Frost imaging process—desirably overlap one edge of the lenticulated substrate 25. The purpose of this feature is merely to provide an area for electrical contact, somewhat broader than the 200 angstrom band which would otherwise be present. This is necessary since the usual technique of Frost imaging requires that the conductive layer be grounded as at point 51 during the imaging and recharging steps of the process.

The photoconductive layer 27 may suitably comprise a thin overcoating of an organic photoconductor such as for example, polyvinyl carbazol doped with tri-nitro fluorinone. Coated atop the layer 27 is a suitable lower melting point thermoplastic layer 28. The latter may comprise any one of a very large class of materials, numerous examples of which are cited in the Gundlach and Gunther application previously alluded to. By way of one specific example this layer may suitably comprise a thin layer of Piccoflex 100A, a composition of essentially polyvinyl chloride, available from the Pennsylvania Industrial Chemicals Co.

In the usual techniques of additive color photography utilizing embossed films, a color-banded filter is placed at the position in FIGURE 1 now accorded aperture plate 16. Although in principle only three bands are necessary—i.e., red, green and blue—for carrying out the additive process, yet it has been common to reduce vignetting problems by placing the red and green bands of the filter in the middle and splitting the blue band into two parts placed respectively above and below the red and green bands. As will be evident from the planar view of aperture plate 16 shown in FIGURE 1A, this same principle has been followed in the placing of the aperture slots 37–40. That is to say that slots 37 and 38 nominally correspond to "blue," slot 39 to "green" and, slot 40 to "red." The sense of these designations will become apparent in what follows.

With the aid of the foregoing the operation of the system depicted in FIGURES 1 and 1A may be readily understood. Initially the light sensitive member 19 is sensitized by electrostatically charging the exposed surface of thermoplastic layer 28. This step has not been illustrated but any of the conventional techniques of xerography may be used such as, for example, spray charging from a corona source. With conductive layer 27 grounded, exposure of the member the CRT image is initiated. As a simple illustration of the exposure technique let us assume that the radar tracking information being fed to the computer control 11 has identified three types of aircraft within the airspace under surveillance. It is desired that the ultimate representation to a viewing audience shall show the first class of aircraft as red, the second class as green and the third class as blue. To accomplish this the signals fed by the computer 11 are so encoded to the display logic 13 that during a first period, $T_1$, the display upon the face of CRT 15—which is monochromatic—comprises only showings of the class 1 aircraft. During this period $T_1$, signals are simultaneously fed via conductor 10 to the electrical actuator 22, which positions the aperture plate 16 so that only light passing through slot 40—nominally identified as red—may be imaged upon the light sensitive member 19. That is to say that during this period $T_1$, aperture plate 16 is so positioned that—as is seen in FIG. 1A—slot 40 therein is adjacent aperture stop 43 in stop plate 42, with a resulting open "red" band occurring at the otherwise occluded stop 43. The light path of one particular lenticule 50 is shown at 41, the curvature of the lenticule being such that electrostatic latent imaging of the lens aperture takes place at approximately point 31 on the charged surface of 28.

It will be readily understood by those skilled in the art that this imaging process is quite analogous to the imaging that occurs in the customary techniques of additive color photography utilizing embossed film and that the image being formed here is equivalent to that regarded in the latter technology as a "red separation" image. However, it will be carefully noted that registration on the light sensitive member has in the present instance been accomplished through the use of the aperture plate 16 and not through the use of a color banded filter. Nevertheless, once this "red separation" image is formed, its source becomes quite irrelevant.

After sufficient exposure time has transpired for adequately registering the "red separation" image, the display of type 1 aircraft is removed from the CRT face and the display of type 2 aircraft is made. During this second period, which we may regard as $T_2$, a signal conducted from the display logic 13 repositions aperture plate 16 so that slot 39—nominally identified as "green"—is adjacent stop 43 and light passing through that part of this slot aligned with stop 43 is imaged on light sensitive member 19. Though a representative light path has not been shown for this second step, it is obvious that in the case of the same lenticule 50 illustrated for light path 41, latent electrostatic imaging will take place at a somewhat different point, here identified by point 32 on the charged thermoplastic layer 28. This same action, integrated over the various lenticules, accordingly results in a latent green separation image interlaced with that produced during the period $T_1$.

Finally the process is repeated for a period $T_3$ during which the aperture plate 16 is positioned so that portions of the slots 37 and 38—nominally identified as "blue"—are aligned with stop 43 and light passing the two resulting open "blue" bands in the otherwise occluded stop 43 is imaged on member 19. Again in the case of lenticule 50 the imaging process will be such that registration of these slots will occur at approximately points 33 and 34; and once again considering the integral action of the multiple lenticules, a latent blue separation image is formed, interlaced with the green and red separation images previously formed.

By means of the successive imaging through the aperture plate 16 a latent electrostatic image comprising an interlaced pattern of the "red," "blue" and "green" separation images is now present on member 19 and a Frost image may be developed by any of the techniques disclosed in the Gunther and Gundlach application previously alluded to. In general, such techniques comprise an electrostatic recharging step, followed or accompanied by heat or vapor softening of the thermoplastic layer 28, whereby Frosting from point to point occurs in accordance with the electrostatic field intensity. In the case illustrated a positive image will accordingly result, that is to say those points at which light has struck the photosensitive surface will be represented by clear areas in the developed member.

Whereas in the customary techniques of additive color photography the developed image is permanent, it is of significance to note that the present image is not. This is desirable for the simple reason that the developed image is not for present purposes, considered to be of any lasting interest. On the contrary, the developed image will subsequently be displayed for but a brief period, after which (in the example given) a new display will be formed to illustrate the rapidly changing positions of the several aircraft. By utilizing Frost imaging in accordance with the present invention, therefore, one is enabled to rapidly erase the image by heat softening or the like, and thus reuse the same member for successive preparation of displays.

The developed interlaced image formed upon the thermoplastic conductive layer 28 is for viewing purposes, however, quite equivalent to that obtained through use of an embossed photographic film. Optical display of the developed image is, as shown in FIGURE 2, accomplished by essentially reversing the process by which the image was formed. The one important distinction is that the aperture plate 16 is now replaced by a banded filter 60, the position and area of such bands exactly coinciding with the open bands created by aperture slots during the exposure process. The resulting arrangement is then essentially that which is customarily used for viewing the embossed films of additive color photography. Illumination provided from the right in the sense of the figure, passes through the transparent member 19 and is imaged upon the screen 65 by means of the lens 17. The manner in which color is now achieved is obvious. By way of example the points 33 and 34, which during the exposure process were registered by lenticule 50 at areas on the photoconductive surface nominally identified as "blue," are during the viewing process projected through points on filter 60 within the blue bands 61 and 62. Similarly point 31, initially recorded on an area nominally identified as "red," through the red band 63, and "green" point 32 is projected through the green band 64. It will, of course, be obvious to those familiar with colorimetry that any and all other colors of the spectrum may be similarly formed by suitable blending of the chosen three primaries.

It is significant to the present invention to appreciate that in the customary techniques of additive color photography utilizing photographic emulsions, the projection member either absorbs or transmits light. In the use of a Frosted member prepared pursuant to the present invention, however, light is either transmitted or scattered. That is to say that while the member 19 still retains all the properties necessary to enable projection of a full color display, viz. that imaged areas remain clear in accordance with the degree of their exposure, yet non-imaged areas will now scatter light rather than absorb it. This is of considerable advantage and significance in preparing display members for use in additive color schemes.

The reason for this is that the introduction of light absorbing filters such as at 60 necessitates the compensating use of high degrees of illumination for the image carrying member; but in the past the presence of light absorbing areas on such members has often created severe problems of overheating during projection of the display.

It will be appreciated by those skilled in the art that the structure of light sensitive member 19 is essentially a flexible one. Continuous lengths of such material can accordingly be formed into a web, and a continuous exposure, develop, projection, erase cycle for such a web may readily be established. This is illustrated in FIGURE 3 wherein a continuous closed web of the material described is shown being circulated step-wise in the direction indicated by the arrows adjacent to the web. Movement of the web to the various stations is controlled by the synchronizing means 75 which in turn is actuated by the computer control 11.

As has already been mentioned, details of the Frost process are fully disclosed in the Gundlach and Gunther application alluded to and need not be re-described here. The use of such material, however, necessitates an initial charging step, and this is accomplished in the system of FIG. 3 by the spray application of charge from corona source 76. The charged area is thereafter step advanced to the exposure station designated generally by the numeral 77. Here the area encompased, which may be considered as a "frame," is successively exposed to differing portions of a monochromatic display in precisely the same manner as was described for the exposure of light sensitive member 19 in FIGURE 1. In the usual case this will mean a series of three consecutive exposures to the nominally-identified red, green and blue coded data.

Subsequently the exposed frame is advanced to a recharging station 78. In accordance with the usual techniques for production of Frost images, the surface is here brought back to an equipotential. Next the portion of the web identified as a frame is advanced to the heat development station indicated generally by the numeral 79. The Frosted image is there developed fully and is finally advanced to the projection station at 80. Here the full color display is achieved in precisely the same manner as was described in connection with FIGURE 2. Thereafter, as a result of successive movement of the web carrying successive images, the frame being considered finally arrives at the heat erasure station indicated at 81. The general application of heat at this point ensures complete erasure of the Frosted image and the now clear frame is ready for reuse in the closed cycle.

While the present invention has been described in terms of specific embodiments thereof, it will be understood in view of the instant disclosure, that numerous variations thereon and modifications thereof may now be readily devised by those skilled in the art without yet departing from the present teaching. Accordingly, the present invention is to be construed broadly and limited in scope only by the claim appended hereto.

What is claimed is:

A method for transforming a monochromatic graphic display into a corresponding graphic display colored in accord with a preselected scheme comprising:
 (a) nominally identifying those portions of said monochromatic display to be imparted a particular color;
 (b) sequentially displaying each of said portions for intervals of time during which the said portion is selectively imaged through those apertures of a selectable multiple aperture plate nominally color identified with the color identification of said portion and through a lens system onto a transparent Frostable lenticulated light sensitive member, said member comprising a photoconductive layer overcoated with a thin layer of a deformable thermoplastic material, the opposite face of said layer being overcoated with a thin layer of transparent conductive material, the face of said conductive layer non-adjacent to said photoconductive layer being in contact with the planar face of a transparent lenticulated substrate, said aperture plate and lens system being positioned with respect to said displayed portion and said lenticulated light sensitive member so that said portion is imaged at points on said light sensitive member behind individual lenticules in accordance with said color identified apertures selected for the particular time interval;

(c) heat developing said light sensitive member to form a visible Frost image;

(d) replacing said aperture plate by a banded color filter, said bands being colored in accord with the nominal color identification of said apertures, the space location of said bands corresponding to the exposure location of the apertures with which said bands are in color accord;

(e) light projecting said Frosted image back through said lens system and said color filter and onto a viewing screen so that points on said developed image nominally identified with said particular colors are projected through bands on said filter corresponding to said colors.

References Cited
UNITED STATES PATENTS

| | | | |
|---|---|---|---|
| 2,382,604 | 8/1945 | Capstaff et al. | 88—24 |
| 3,055,006 | 9/1962 | Dreyfoos et al. | |
| 3,117,488 | 1/1964 | Giordano | 95—1.7 X |
| 3,196,011 | 7/1965 | Gunther et al. | 96—1.1 |

OTHER REFERENCES

Sullivan, William A., and Kneiser, James J.: Tone Reproduction by Frost Images; in Photographic Science and Engineering, vol. 8, No. 4; p. 206–211, July–August 1964.

NORTON ANSHER, *Primary Examiner.*

F. L. BRAUN, *Assistant Examiner.*